US008517390B2

(12) United States Patent
Doelp et al.

(10) Patent No.: US 8,517,390 B2
(45) Date of Patent: Aug. 27, 2013

(54) METHOD AND DEVICE FOR CENTERING AND CLAMPING A WORKPIECE IN A BALANCING MACHINE

(71) Applicant: Schenck RoTec GmbH, Darmstadt (DE)

(72) Inventors: Juergen Doelp, Darmstadt (DE); Christian Muth, Gross-Bieberau (DE); Karlheinz Timtner, Bad Homburg (DE)

(73) Assignee: Schenck Ro Tec GmbH, Darmstadt (DE)

( * ) Notice: Subject to any disclaimer, the term of this patent is extended or adjusted under 35 U.S.C. 154(b) by 0 days.

(21) Appl. No.: 13/710,687

(22) Filed: Dec. 11, 2012

(65) Prior Publication Data
US 2013/0093147 A1 Apr. 18, 2013

Related U.S. Application Data

(62) Division of application No. 12/218,003, filed on Jul. 10, 2008, now Pat. No. 8,359,727.

(30) Foreign Application Priority Data

Jul. 11, 2011 (DE) .......................... 10 2007 032 608

(51) Int. Cl.
B23B 5/22 (2006.01)
B23B 31/20 (2006.01)
(52) U.S. Cl.
USPC ........... 279/2.03; 279/133; 279/137; 279/141
(58) Field of Classification Search
USPC ................... 279/2.03, 133, 137, 141; 29/559

IPC ............................... B23B 5/22,31/20
See application file for complete search history.

(56) References Cited

U.S. PATENT DOCUMENTS

| 3,281,158 | A |   | 10/1966 | Gibbons |       |
|-----------|---|---|---------|---------------|-------|
| 3,610,642 | A |   | 10/1971 | Fischer et al.|       |
| 3,953,013 | A |   | 4/1976  | Griffith et al.|      |
| 4,802,680 | A | * | 2/1989  | Fuchs ........... | 279/33 |
| 4,890,541 | A |   | 1/1990  | Spooner       |       |
| 4,898,397 | A |   | 2/1990  | Smith         |       |

(Continued)

FOREIGN PATENT DOCUMENTS

| DE | 39 09 630  | 9/1990 |
| DE | 103 05 714 | 8/2004 |
| EP | 0 557 240  | 8/1993 |

OTHER PUBLICATIONS

European Search Report in EP 08159494.7 dated Dec. 6, 2010 with English translation of relevant parts.

Primary Examiner — Eric A Gates
(74) Attorney, Agent, or Firm — Collard & Roe, P.C.

(57) ABSTRACT

The chuck includes a centering clamping member having a variable diameter, a radially extending clamping surface, which is adjacent to the centering clamping member, a movable clamping element, a first spring element, via which the centering clamping member can be moved into a clamping position, a second spring element, via which the clamping element can be loaded with a first force, a third spring element, via which the clamping element can be loaded with a second, higher force, and an axially movable actuating device by which the centering clamping member and the clamping element can be moved into a release position against the force of the first and third spring elements.

18 Claims, 4 Drawing Sheets

(56) References Cited

U.S. PATENT DOCUMENTS

| | | |
|---|---|---|
| 5,197,720 A | 3/1993 | Renz et al. |
| 5,419,193 A | 5/1995 | Borner et al. |
| 5,503,508 A | 4/1996 | Amiguet et al. |
| 5,983,483 A | 11/1999 | Tarumizu |
| 6,467,775 B1 | 10/2002 | Denzinger |
| 7,636,999 B2 | 12/2009 | Choi et al. |
| 7,926,162 B2 | 4/2011 | Wolters |
| 7,958,619 B1 * | 6/2011 | Pletschet ............ 29/559 |
| 8,123,233 B2 | 2/2012 | Hofmann |
| 2011/0260416 A1 | 10/2011 | Helm |
| 2012/0213668 A1 * | 8/2012 | Akutsu et al. ........ 422/68.1 |

\* cited by examiner

METHOD AND DEVICE FOR CENTERING AND CLAMPING A WORKPIECE IN A BALANCING MACHINE

CROSS REFERENCE TO RELATED APPLICATIONS

This application is a divisional of and Applicant claims priority under 35 U.S.C. §§120 and 121 of parent U.S. patent application Ser. No. 12/218,003 filed Jul. 10, 2008, which application is based upon and claims the benefit of priority under 35 U.S.C. §119 of German Patent Application No. 10 2007 032 608.6, filed on Jul. 11, 2011, the disclosures of each of which are incorporated herein in their entirety by reference.

BACKGROUND AND SUMMARY OF THE INVENTION

The invention relates to a method for centering and clamping a workpiece, in particular an articulated shaft, in a balancing machine and a chuck for carrying out the method.

For balancing, workpieces must be rotatably mounted in a balancing machine in such a manner that the rotation axis which the workpieces each assume in their subsequent operating position corresponds as precisely as possible to the rotation axis of the balancing machine. When the workpieces are received in a chuck, in order to determine the rotation axis, the workpieces are generally provided with a mostly cylindrical centering surface and with a rotationally symmetrical mostly planar contact surface which extends radially and by means of which the rotation axis of the workpiece is determined. In the chuck there are provided receiving members which co-operate with these surfaces, for example, a radially supporting centering clamping member, axially supporting clamping surfaces or the like, to which the workpiece is securely clamped by means of clamping elements. When securely clamping, it may be necessary for the clamping at the centering surface of the workplace and the clamping at the radial contact surface not to be able to take place at the same time, so that particular attention must be paid in order to prevent the workpiece from being clamped in an inclined manner.

For balancing, articulated shafts are generally secured in a horizontal position, by the ends thereof, to two spindles of a balancing machine, each spindle having a chuck in which the flange which is arranged at the end of the articulated shaft is centered and clamped. In this instance, chucks are used which are configured in such a manner that the flange of the articulated shafts becomes centered in the conical clamping device thereof, which engages in a hole of the flange, and is radially clamped with significant actuating force. Subsequently, the flange is pressed with a radial contact surface, by means of connecting rods and clamping elements which surround the flange from the outer side, against a clamping surface of the chuck. In this instance, it may be the case that, owing to the radial clamping with significant actuating force which has been previously carried out, the axial pressing force of the clamping elements is no longer sufficient to press the contact surface of the flange in a uniform manner against the clamping surface of the chuck. The flange may therefore be in an inclined position which results in an inadmissibly significant and irreproducible error during the balancing operation.

An object of the invention is to provide a method of the type mentioned in the introduction which prevents clamping errors and which ensures very precise clamping of the workpieces. The method is further intended to be able to be carried out automatically. Furthermore, an object of the invention is to provide a chuck for a balancing machine which ensures automatic centering and clamping of workpieces, in particular articulated shafts, with a high level of precision.

According to the invention, the method for achieving the object set out involves the steps of positioning a workpiece with a centering surface on a centering clamping member of a chuck, pressing a radial contact surface of the workpiece against a clamping surface of the chuck with a first force which still allows radial movement of the workpiece, centering the workpiece by clamping the centering clamping member against the centering surface of the workpiece, and pressing the radial contact surface of the workpiece against the clamping surface of the chuck with a greater second force which securely clamps the workpiece. Preferably, the second force is at least three times greater than the first force.

In accordance with the method according to the invention, the planar radial contact surface of the workpiece is first pressed with a relatively small first force against the clamping surface of the chuck. A parallel orientation of the rotation axes of the chuck and workpiece is thereby achieved, but with the workpiece still being able to be radially displaced for the subsequent centering operation. Owing to the subsequent clamping of the centering clamping member, the workpiece can therefore be precisely centered, the contact between the planar contact surface and the clamping surface and consequently the correct orientation of the rotation axis of the workpiece being maintained owing to the axial effect of the first force. After the radial clamping of the centering clamping member, which can also be carried out with a high degree of force, the rotation axis of the workpiece is orientated in an optimal manner relative to the rotation axis of the chuck so that owing to the subsequent axial clamping of the workpiece with the significantly greater second force, the workpiece can be definitively fixed in the chuck. Inclined clamping of the workpiece is prevented in this instance In accordance with the invention, one advantageous device for carrying out the method according to the invention comprises a centering clamping member with a centering portion having a variable diameter, a radially extending clamping surface, which is adjacent to the centering clamping member, a movable clamping element for axially pressing the workpiece against the clamping surface, a first spring element via which the centering clamping member can be moved into a clamping position, a second spring element via which the clamping element can be loaded with a first force, a third spring element, via which the clamping element can be loaded with a second force, and an axially movable actuating device by which the centering clamping member and the clamping element can be moved into a release position against the force of the first and third spring elements.

The device according to the invention allows automatic clamping and centering of a workpiece with defined forces and reliably prevents the occurrence of clamping errors. The device further has the advantage that it is kept play-free by means of the spring elements and therefore no oscillations occur which impair the accuracy of the unbalance measurement.

BRIEF DESCRIPTION OF THE DRAWINGS

The invention is explained in greater detail below with reference to embodiments which are illustrated in the drawings, in which.

DETAILED DESCRIPTION OF THE PREFERRED EMBODIMENTS

Figure 1:
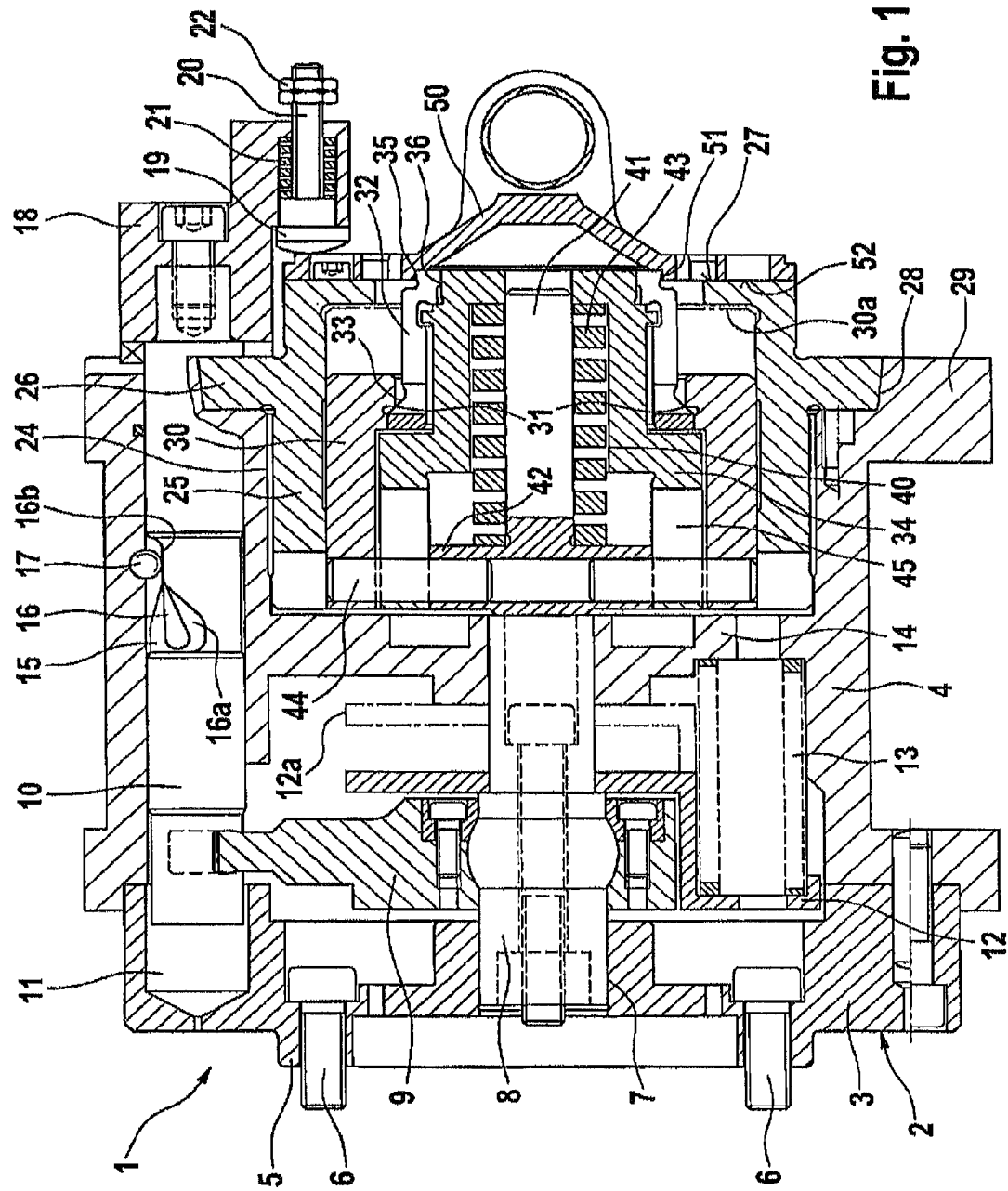
FIG. 1 is an axial section of a chuck which can be connected to the spindle of a balancing machine.
Figure 2:
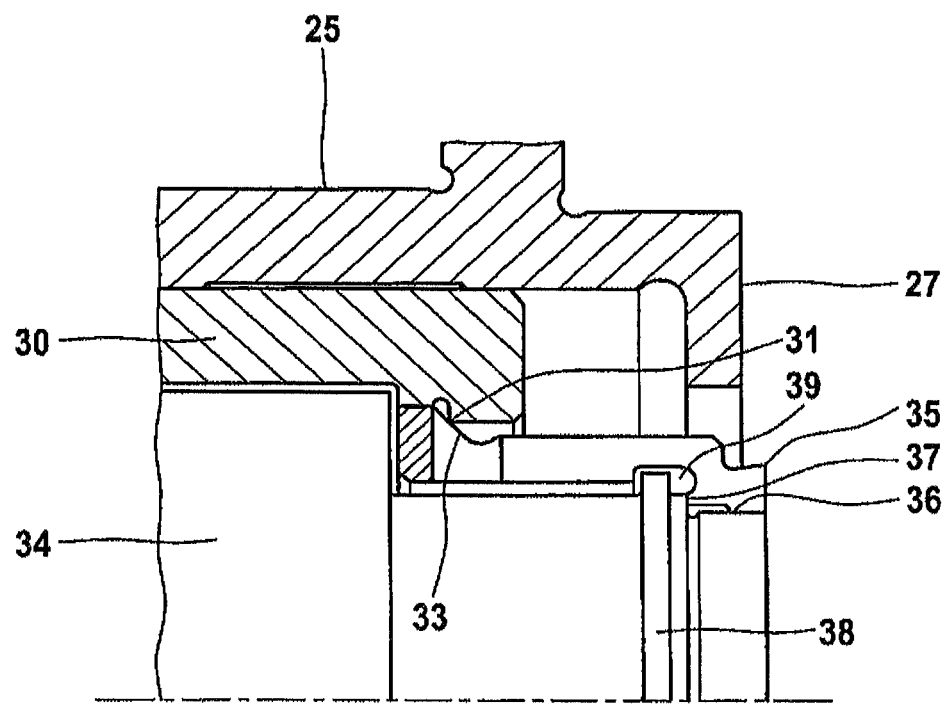
FIG. 2 is a section of the chuck according to FIG. 1.

The chuck 1 which is illustrated in FIGS. 1 and 2 has a chuck housing 2 which is composed of a flange portion 3 and a housing portion 4. On the flange portion 3 there is formed a centering ring 5 which serves to centre the flange portion 3 on a spindle flange of a balancing machine. The flange portion 3 can be secured to the spindle flange by means of screws 6.

The chuck housing 2 has a central hole 7 in which an actuating element 8 is mounted so as to be longitudinally movable. There are secured to the actuating element 8 at least two arms 9 which extend radially outwards in the chuck housing 2. The radially outer ends of the arms 9 are each connected to a connecting rod 10 which is mounted so as to be rotatable and longitudinally movable in a hole 11 in the chuck housing 2 that is axially parallel to the hole 7. The connection between an arm 9 and a connecting rod 10 is constructed in such a manner that the connecting rod 10 can be rotated relative to the arm 9. In an axial direction, the connection is positive-locking and substantially play-free. At the side of the arms 9 facing away from the flange portion 3, the actuating element 8 carries a spring plate 12. A plurality of biased compression springs 13 are arranged at a uniform distance from one another around the actuating element 8 and are clamped between the spring plate 12 and a wall 14 of the housing portion 4.

Each connecting rod 10 has, in the hole 11, a drive portion 15 with a groove 16 which has a helical portion 16a and a straight portion 16b. A ball 17 which is supported in a spherical formation in the hole wall engages in the groove 16 and, by means of the helical portion 16a, causes the connecting rod 10 to rotate when it is moved in the longitudinal direction of the hole 11. If the ball 17 engages in the straight portion 16b, the connecting rod 10 is secured against rotation. The front end of the connecting rod 10 remote from the flange portion 3 protrudes from the chuck housing 2. At this end of the connecting rod 10, a clamping element 18 is secured by means of a screw. The clamping element 18 has a hole which is parallel to the axis of the connecting rod 10 and in which a shaft 20 of a dome-headed clamping member 19 and a compression spring 21 are arranged. The compression spring 21 surrounds the shaft 20 and is supported at one end on the dome-headed clamping member 19 and at the other end on the clamping element 18. At the free end of the shaft 20 protruding from the hole of the clamping element 18, two mutually tightened stop nuts 22 are arranged and limit a movement of the dome-headed clamping member 19 in the direction towards the chuck housing 2 brought about by the compression spring 21. In the opposite direction, the dome-headed clamping member 19 can be directly supported on the clamping element 18.

At the side facing the flange portion 3, the housing portion 4 of the chuck housing 2 has a cup-shaped recess 24 in which a mandrel housing 25 is arranged. The mandrel housing 25 is precisely centered in the recess 24 by means of centering surfaces and has an annular collar 26 which is securely connected to the housing portion 4 by means of screws which are not illustrated. The collar 26 is centered with a conical lateral surface 28 in a conical portion 29 of the housing portion 4 and supported in an axial direction. The end face of the mandrel housing 25 facing away from the housing portion 4 forms a planar, annular clamping surface 27 against which a workpiece 50 can be clamped using the clamping element 18 and the dome-headed clamping member 19.

An actuating bushing 30 with an actuating edge 31 formed in the bushing hole is axially movably arranged in a cylindrical hole of the mandrel housing 25. The actuating bushing 30 actuates a cylindrical clamping member 32 which protrudes into the actuating bushing 30 and has a conical actuating surface 33 which co-operates with the actuating edge 31. The cylindrical clamping member 32 has the shape of a bushing provided with slots and is mounted on a base element 34 which is arranged in the mandrel housing 25 and is rigidly connected thereto. One, front end of the cylindrical clamping member 32, at the side facing away from the housing portion 4, protrudes from the mandrel housing 25 and is provided with a centering portion of a smaller diameter which forms a clamping edge 35 with the outer side thereof. On the inner side, the centering portion has a supporting edge 36 which adjoins the base element 34 and a stop edge 37 which adjoins a shoulder of the base element 34 in an axial direction. Owing to a projection 38 which is formed on the base element 34 and which engages in an annular groove 39 in the hole of the cylindrical clamping member 32, the cylindrical clamping member 32 is also secured against displacements in an axial direction.

In a stepped hole 40 of the base element 34, an actuating member 41 is longitudinally movably arranged. The end of the actuating member 41 adjacent to the housing portion 4 is provided with a flange 42. Between the flange 42 and a shoulder of the base element 34, a biased compression spring 43 is arranged and is guided on the actuating member 41. The compression spring 43 serves to actuate the actuating bushing 30 which is securely connected to the flange 42 of the actuating member 41 by means of at least one, preferably several connecting bolt(s) 44. The connecting bolt 44 extends through a slot 45 in the base element 34. The length of the slot 45 is adapted to the actuating path of the actuating bushing 30.

The operating method of the chuck 1 is as follows:

In the release position provided for inserting or removing a workpiece 50, the actuating element 8 is pushed so far to the right-hand side in the drawing by means of the actuating device of the balancing spindle that the spring plate 12 abuts the wall 14, as indicated by the dot-dash line 12a. The actuating member 41 adjacent to the actuating element 8 is displaced to the same extent so that the actuating bushing 30 is in the position 30a. The movement of the actuating element 8 and the actuating member 41 into the position mentioned is carried out counter to the force of the compression springs 13 and 43 which are compressed to a greater extent during this movement and reach their maximum bias. The actuating edge 31 has, relative to the actuating surface 33 of the cylindrical clamping member 32, a large axial spacing which is required in order to achieve a sufficiently large pivot angle of the clamping elements 18. The arms 9 which are connected to the actuating element 8 and the connecting rods 10 which are connected thereto are also displaced to the right to a corresponding extent and, owing to the co-operation of the groove 16 and ball 17, are rotated into a position in which the dome-headed clamping member 19 of the respective clamping element 18 is pivoted radially outwards away from the clamping surface 27.

The workpiece 50 is inserted into the chuck 1, which is in the release position, in such a manner that it surrounds the clamping edge 35 of the cylindrical clamping member 32 with the hollow cylindrical centering surface 51 of said workpiece and abuts the clamping surface 27 with the planar contact surface 52 thereof. If this is the case, the actuating device of the balancing spindle is returned to the retracted initial position thereof in order to clamp and centre the workpiece 50. In this case, the connecting rods 10, which are connected to the actuating element 8, and the actuating bushing 30 are moved to the left by the force of the compression springs 13, 43. This first results in the connecting rods 10 being rotated into the clamping position, the clamping elements 18 with the dome-headed clamping member 19 thereof pivoting over the workpiece 50 and the dome-headed clamping members 19 pressing the workpiece 50 against the clamping surface 27 owing to the smaller force of the compression springs 21. The force of the compression springs 21 in this instance is of such a size that the workpiece 50 is held in abutment against the clamping surface 27 but the friction present can be overcome and the workpiece can still be radially displaced relative to the clamping surface 27. After this clamping state has been achieved, owing to the continuing movement of the actuating element 8, the actuating edge 31 of the actuating bushing 30 comes into contact with the actuating surface 33 of the cylindrical clamping member 32 and acts on the cylindrical clamping member 32. The outer diameter thereby increases in the region of the clamping edge 35 and the clamping edge 35 is pressed against the centering surface 51 of the workpiece 50, the cylindrical clamping member 32 being supported radially inwards on the base element 34 by the supporting edge 36 and thereby ensuring precise centering of the workpiece 50.

When the centering operation which is brought about exclusively by the compression spring 43 is complete, the actuating element 8 is raised from the actuating member 41 and moves the connecting rods 10 further to the left under the action of the compression springs 13. The compression spring 21 is thereby compressed to an even greater extent and the rear side of the dome-headed clamping member 19 comes into contact with the clamping element 18. The significantly greater actuating force of the compression spring 13 is thereby transferred to the dome-headed clamping member 19 and the workpiece 50 is pressed against the clamping surface 27 with a greater force. Owing to the greater pressing force, the workpiece 50 is securely and reliably retained in the chuck 1 for the balancing operation which is subsequently to be carried out. The drawing illustrates the chuck 1 in the achieved clamping position, in which the workpiece 50 is retained in the chuck 1 in a precisely centered state.

The operating method described for the chuck has the advantage that the workpiece can be centered and clamped with a high level of precision and clamping errors, such as an inclined position of the workpiece, are prevented. Furthermore, it is advantageous that the entire clamping operation is carried out in a completely automated manner after the workpiece has been inserted and no specific adjustment measures are required. The chuck is further characterized by a compact structure which can also be used in place of chucks which are already present.

Figure 3:
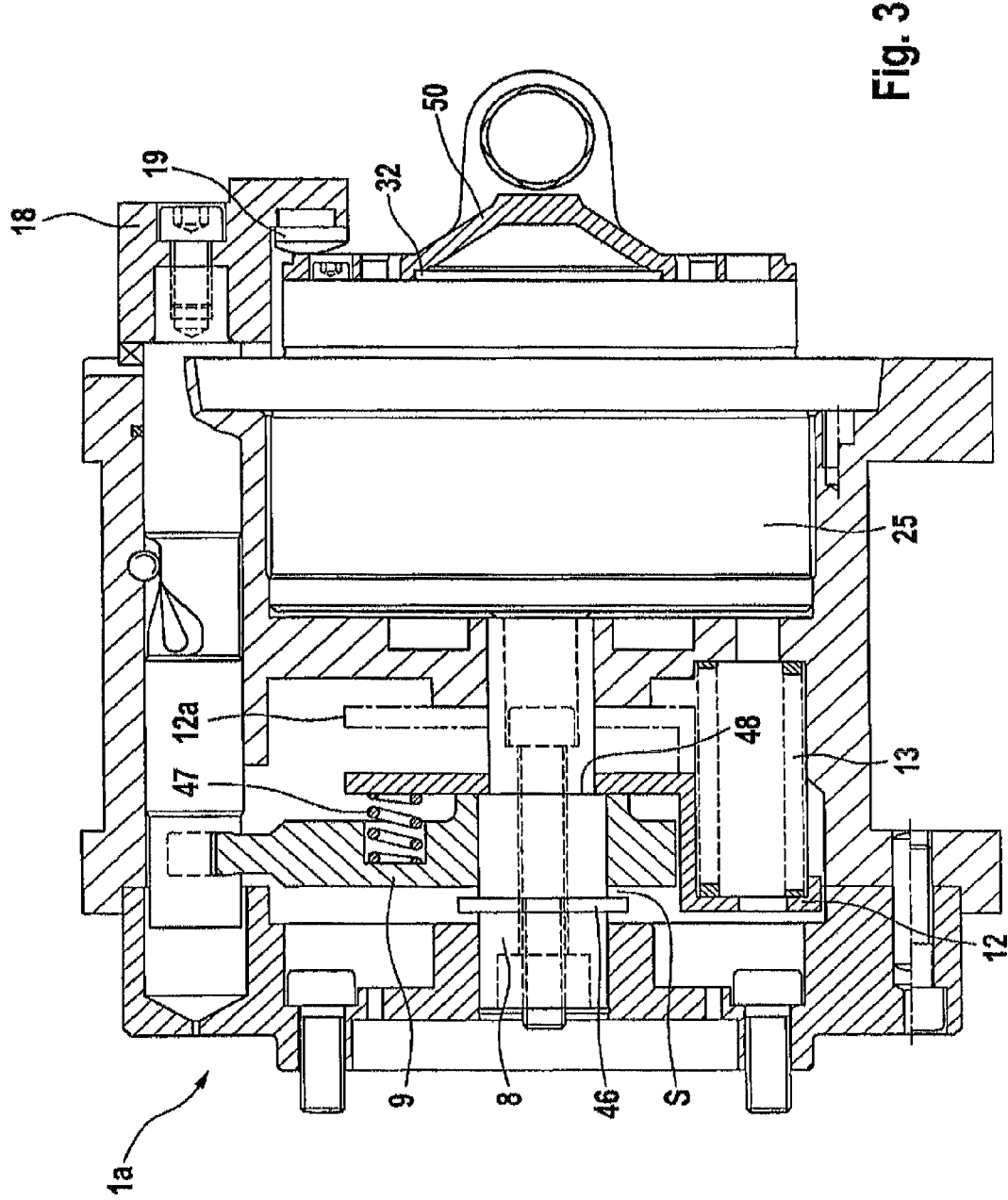
FIG. 3 is an axial section of a second configuration of a chuck which can be connected to the spindle of a balancing machine and FIG. 4 is a section of a third configuration of a chuck which can be connected to the spindle of a balancing machine.

FIG. 3 illustrates a modified chuck 1a which differs from the chuck 1 described above owing to a different arrangement of the compression spring 21 but which otherwise substantially corresponds to the chuck 1. The same reference numerals are therefore used below for corresponding components.

With the chuck 1a, the arms 9 which form an integral component are arranged axially movably on the actuating element 8. At the side of the arms 9 facing the flange portion 3, the actuating element 8 is provided with a stop 46 on which the arms 9 can be supported in an axial direction. Between the stop 46 and the arms 9, in the clamping position illustrated in FIG. 3, there is an axial play S. At the opposite side, the arms 9 have an annular collar which is in abutment against the spring plate 12 under the action of the compression springs 13. At the side thereof facing the spring plate 12, the arms 9 each have a blind hole in which a biased compression spring 47 is arranged and is supported on the spring plate 12. The compression spring 47 replaces the compression spring 21 which is arranged in the clamping element 18 in the case of the chuck 1. In the chuck 1a, the dome-headed clamping member 19 is therefore securely connected to the clamping element 18.

In the clamping position illustrated in FIG. 3, the compression springs 47 are biased to the maximum extent. The sum of their bias forces is considerably smaller than the sum of the bias forces of the compression springs 13.

If the actuating element 8 is actuated in order to loosen the chuck 1a, the spring plate 12 is first moved towards the right-hand side in the drawing by a step 48 of the actuating element 8, the compression springs 13 being clamped to a greater extent. Owing to the bias of the compression springs 47, which is slightly decreased, the arms 9 are retained in their clamping position. After overcoming the play S, the arms 9 are also carried by the stop 46 by the movement of the actuating element 8 and the chuck is moved into the release position, in which the spring plate 12 is at the location 12a and in which the clamping elements 18 are pivoted away from the workpiece 50.

The clamping of the workpiece 50 is carried out using the reverse movement sequence, the clamping elements 18 with the dome-headed clamping members 19, driven by the compression springs 13 and the compression spring 43 which is arranged inside the mandrel housing 25, first being positioned against the workpiece 50 and pressed with the force of the compression springs 47, then the cylindrical clamping member 32 being clamped and finally, when the spring plate 12 abuts the arms 9, the workpiece 50 being securely clamped by the dome-headed clamping members 19 with the significantly greater force of the compression springs 13.

Figure 4:
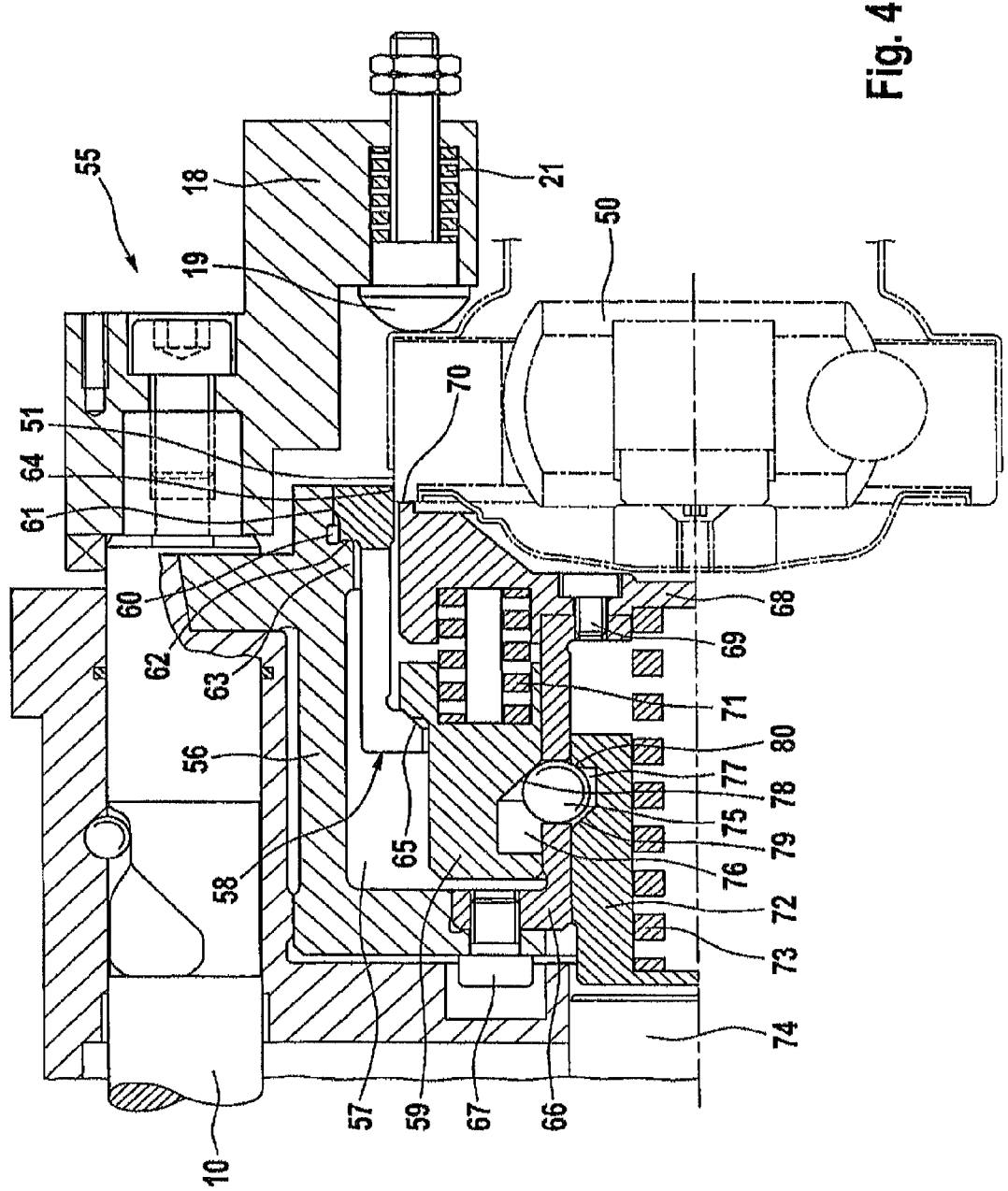

FIG. 4 illustrates a further configuration of a chuck 55 according to the invention which is configured to clamp and centre the workpiece on a cylindrical outer face. The chuck 55 has a cup-shaped clamping member housing 56 with a hole 57 in which a cylindrical clamping member 58 and an actuating bushing 59 are arranged. The cylindrical clamping member 58 has the shape of a substantially cylindrical bushing which is provided with axially parallel slots and which has reinforced end portions. The front end portion forms a radially outwardly protruding shoulder which engages in an annular centering recess 60 at the open end of the hole 57 and which is supported with a supporting edge 61 radially outwardly on the wall of the centering recess 60 and with a stop edge 62 in an axial direction on a shoulder 63 of the clamping member housing that delimits the centering recess 60. The front end face of the cylindrical clamping member 58 is flush with the front end face of the clamping member housing 56 and forms, together with the hole face of the front end portion, a clamping edge 64 for centering and clamping a workpiece. The rear end portion of the cylindrical clamping member 58 forms a radially inwardly protruding collar with an inner conical actuating surface 65 which faces the clamping edge 64 and which co-operates with a shoulder of the actuating bushing 59. The actuating bushing 59 is axially movably mounted on a cylindrical tube member 66 which is arranged in the hole of the clamping member housing 56 and which is securely connected to the clamping member housing 56 by means of screws 67. At the front end of the tube member 66, a plate 68 is secured by means of screws 69. The plate 68 extends radially outwards as far as the proximity of the clamping edge 64 and has, at that location, a radial clamping surface 70 which is formed by an annular collar. The mutually opposing regions of the plate 68 and the actuating bushing 59 are provided with coaxial blind holes in which biased compression springs 71 are arranged with uniform peripheral spacing. The compression springs 71 press the actuating bushing 59 against the actuating surface 65, whereby the cylindrical clamping member 58 is clamped.

In the hole of the tube member 66, a cup-like actuating member 72 is arranged and is loaded by a compression spring 73 which is supported on the plate 68. Opposite the actuating member 72 is an actuating member 74 by means of which the actuating member 72 can be actuated counter to the force of the compression spring 73. The actuating member 72 is operationally connected to the actuating bushing 59 by means of balls 75. The balls 75 are located with uniform mutual spacing in radial through-holes of the tube member 66 and their centre points are located in a common radial plane. The diameter of the balls 75 is approximately two to three times as large as the wall thickness of the tube member 66 so that the balls 75 can protrude inwardly and outwardly from the wall of the tube member 66. The balls 75 engage in an annular groove 76 in the hole face of the actuating bushing 59 and in an annular groove 77 in the lateral surface of the actuating member 72. One side wall 78 of the annular groove 76, which is adjacent to the end of the actuating bushing 59 acted on by the compression spring 71, is constructed in a conical manner with an inclination of approximately 45 [deg.] relative to the longitudinal axis. The annular groove 77 has a conical side wall 79 with a corresponding inclination, which abuts the contact locations between the balls 75 and the locations of the balls 75 diametrically opposite the side wall 78. The balls 75 form with the annular grooves 76, 77 a transmission means which transmits the movement of the actuating member 72 to the actuating bushing 59 and after reaching a predetermined actuating distance, disconnects the transmission connection between the actuating member 72 and the actuating bushing 59 so that the actuating member 72 can be moved further independently of the actuating bushing 59.

As with the chuck 1 illustrated in FIG. 1, with the chuck 55 the actuating element 74 is also connected by means of arms 9 and connecting rods 10, which are not illustrated, to clamping elements 18, which clamp the workpiece 50 against the clamping surface 70 by means of dome-headed clamping members 19, which are supported on springs 21.

FIG. 4 illustrates the chuck 55 in the clamping position in which a workpiece 50 is clamped in a precisely centered manner for the subsequent balancing operation. The compression springs 71 act, via the actuating bushing 59, on the cylindrical clamping member 58, whereby the clamping edge 64 of said member is pressed against the cylindrical centering surface 51 of the workpiece 50. In an axial direction, the workpiece 50 is securely clamped between the clamping surface 70 and the dome-headed clamping member 19 with a significant actuating force which is produced by means of a resilient element which is not illustrated and which acts on the actuating element 74. Between the actuating element 74 and the actuating member 72, there is provided a gap and the actuating member 72 is supported, with the edge 80 of the annular groove 77 that faces the side wall 79 and is provided with a conical face, on the balls 75 under the action of the compression spring 73. The balls 75 are thereby pressed radially outwards against the side wall 78 and are thereby kept play-free. The force of the compression spring 73 is significantly smaller than the force of the compression spring 71 so that the play-free retention of the balls 75 has no significant influence on the actuation of the cylindrical clamping member 58.

The workpiece 50 is unclamped from the chuck 55 by moving the actuating element 74 in the direction towards the plate 68. Owing to this movement, which is also transmitted to the connecting rods 10, the axial clamping force is first reduced since the dome-headed clamping members 19 are raised from the clamping elements 18 and then still pressed against the workpiece 50 only by the weaker compression springs 21. The actuating element 74 then moves into engagement with the actuating member 72 and presses it with the side wall 79 against the balls 75. The balls 75 are thus pressed radially outwards into the annular groove 76, whereby the actuating bushing 59 moves past the plate 68 and the compression springs 71 are compressed. The actuating bushing 59 is thus released from the actuating surface 65 of the centering clamping member 58 so that, owing to the inherent resilience thereof, it assumes its release position in which the inner diameter of the clamping edge 64 is greater than the outer diameter of the centering surface 51 of the workpiece 50. When this position of the actuating element 74 is reached, the dome-headed clamping members 19 still hold the workpiece 50 securely under the action of the compression springs 21. In order to completely release the workpiece 50, the actuating element 74 is moved further in the direction towards the plate 68. In this case, the balls 75 are forced completely from the annular groove 77 so that the actuating member 72 can be pushed past the balls 75 further in the direction towards the plate 68, without this movement being transmitted to the actuating bushing 59. The actuating path of the actuating bushing 59 and the compression springs 71 which are supported thereon therefore remains relatively small, which has structural advantages. Furthermore, the force of the compression springs 71 no longer has to be overcome by the drive device which moves the actuating element 74, but instead only by the friction resistance brought about by the force of these springs. Owing to this last portion of the actuating path of the actuating element 74, the dome-headed clamping members 19 are released from the workpiece and the clamping elements 18 are pivoted out of the supply region for the workpiece by the rotation of the connecting rods 10.

The clamping of a new workpiece is carried out by reversing the movement sequence described, the dome-headed clamping members 19 first being activated under the action of the compression springs 21, then the cylindrical clamping member 58 under the action of the compression springs 71 and finally the greater force of a resilient element which acts on the actuating element 74 by means of the dome-headed clamping members 19, again in succession.

What is claimed is:

1. Chuck for centering and clamping a workpiece in a balancing machine comprising a centering clamping member with a centering portion having a variable diameter, a radially extending clamping surface, which is adjacent to the centering clamping member, a movable clamping element for axially pressing the workpiece against the clamping surface, a first force-exerting element via which the centering clamping member can be moved into a clamping position, a second force-exerting element via which the clamping element can be loaded with a first force, a third force-exerting element, via which the clamping element can be loaded with a second force, and an axially movable actuating device by which the centering clamping member and the clamping element can be moved into a release position against the force of the first and third force-exerting elements.

2. Chuck according to claim 1, wherein the second and third force-exerting elements are designed for loading the clamping element with a second force that is greater than the first force.

3. Chuck according to claim 2, wherein the second force is three times greater than the first force.

4. Chuck according to claim 1, wherein the clamping element is attached to the end of a connecting rod.

5. Chuck according to claim 4 comprising a chuck housing with a central hole, in which an actuating element is mounted so as to be longitudinally movable, which element comprises at least one arm that extends radially outwards in the chuck housing, the radially outer end of the arm being connected to the connecting rod, which is mounted so as to be rotatable and longitudinally movable in the chuck housing in a hole that is axially parallel to the hole.

6. Chuck according to claim 5, wherein the arm is mounted on the actuating element so as to be axially movable between a stop on the actuating element and a spring plate supported by the actuating element and biased by compression springs on the side remote from the actuating element, and wherein a biased compression spring, as the second force-exerting element, is arranged between the spring plate and the arm.

7. Chuck according to claim 4, wherein the connecting rod comprises a drive portion with a groove, which has a helical portion and a straight portion, wherein a projection fixed to the housing engages with the groove in such a way that the straight portion prevents the connecting rod from rotating and the helical portion causes the connecting rod to rotate when the connecting rod is moved in the longitudinal direction of the hole.

8. Chuck according to claim 1, wherein the actuating element carries a spring plate, a plurality of biased compression springs being arranged as the third force-exerting element at a uniform distance from one another around the actuating element and being clamped between the spring plate and a wall of the chuck housing.

9. Chuck according to claim 1, wherein the clamping element comprises a hole, in which a dome-headed clamping member and a compression spring, as the second force-exerting element, are arranged.

10. Chuck according to claim 1, wherein the chuck housing comprises a cup-shaped recess, in which a mandrel housing is arranged.

11. Chuck according to claim 10, wherein an end face of the mandrel housing or a part connected to the mandrel housing forms a planar, annular clamping surface.

12. Chuck according to claim 10, wherein an actuating bushing with an actuating edge formed in the bushing hole for actuating the cylindrical clamping member is axially movably arranged in a cylindrical hole in the mandrel housing.

13. Chuck according to claim 10, wherein the cylindrical clamping member has the shape of a bushing provided with slots, which bushing is mounted on a base element arranged in the mandrel housing and rigidly connected thereto or on the mandrel housing.

14. Chuck according to claim 13, wherein an actuating member with a flange is longitudinally movably arranged in a stepped hole in the base element and a biased compression spring, as the first force-exerting element, is arranged between the flange and a shoulder of the base element.

15. Chuck according to claim 14, wherein the actuating bushing is rigidly connected to the flange of the actuating member by means of at least a connecting bolt.

16. Chuck according to claim 1, wherein a transmission means is provided, which transmits a movement of the actuating member to the actuating bushing and disconnects the transmission connection between the actuating member and the actuating bushing once a predetermined actuating distance has been reached.

17. Chuck according to claim 16, wherein the actuating bushing is mounted so as to be axially movable on a cylindrical tube member, which is arranged in the hole in the clamping member housing, wherein a plate is fastened to the leading free end of the tube member by screws, and biased compression springs forming the first force-exerting element are arranged between the actuating bushing and the plate.

18. Chuck according to claim 17, wherein an actuating member is arranged in the hole in the tube member, which actuating member is loaded via a compression spring supported on the plate and wherein balls are arranged in radial through-holes in the tube member, which balls engage in an annular groove in the hole surface of the actuating bushing and in an annular groove in the lateral surface of the actuating member in such a way that an axial movement can be transmitted from the actuating member to the actuating bushing.

* * * * *